Feb. 16, 1943. J. C. HOYT 2,311,438
CIRCUIT CONTROL SYSTEM
Filed Feb. 6, 1942
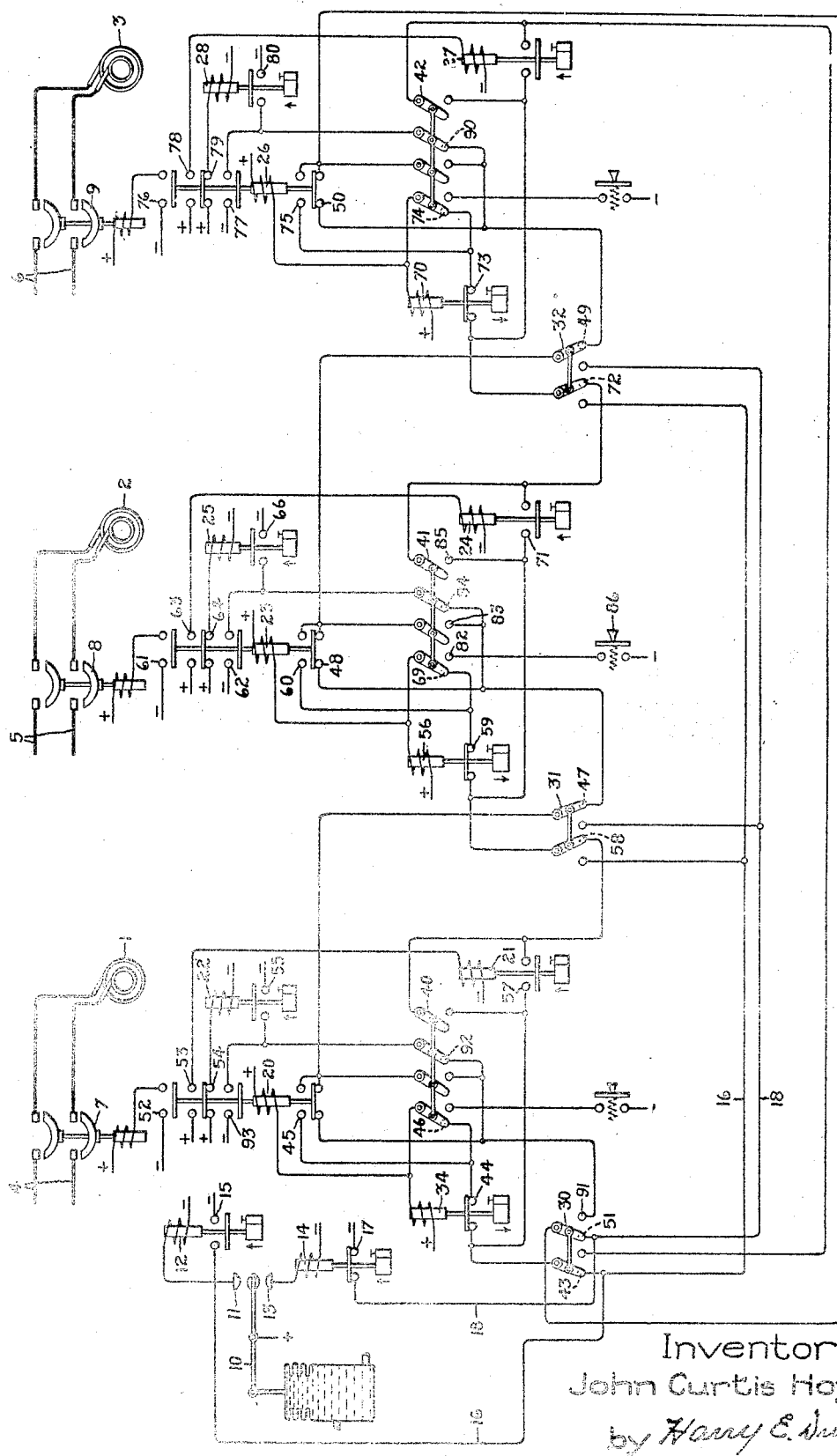
Inventor:
John Curtis Hoyt,
by Harry E. Dunlay
His Attorney.

Patented Feb. 16, 1943

2,311,438

UNITED STATES PATENT OFFICE 2,311,438

CIRCUIT CONTROL SYSTEM

John Curtis Hoyt, Upper Darby, Pa., assignor to General Electric Company, a corporation of New York Application February 6, 1942, Serial No. 429,836

10 Claims. (Cl. 171—118)

My invention relates to circuit control systems and particularly to systems which control the sequence in which a plurality of devices are arranged to be operated.

An object of my invention is to provide an improved arrangement of apparatus whereby any one of a plurality of devices may be operated first, and then the remaining devices are operated in a predetermined sequence.

Another object of my invention is to provide an improved arrangement of apparatus whereby any one or more of a plurality of devices may be cut out of a predetermined sequence of operation without affecting the sequential operation of the other devices, and may be operated independently of the automatic sequential operation of the other devices.

My invention will be better understood from the following description when taken in connection with the accompanying drawing, the single figure of which diagrammatically illustrates a control arrangement for sequentially operating a plurality of electric motors, which embodies my invention, and the scope of my invention will be pointed out in the appended claims.

Referring to the drawing, 1, 2, and 3 represent electric motors which are respectively arranged to be connected to suitable supply circuits 4, 5, and 6 by suitable line switches 7, 8 and 9. For the purpose of this description, it will be assumed that the motors 1, 2, and 3, respectively, drive suitable water pumps, not shown, so as to maintain the water pressure in a water system supplied thereby at a predetermined value. 10 represents a suitable water pressure responsive device of any suitable type, examples of which are well-known in the art, which is so arranged that when the water pressure of the water system is below a predetermined value, it closes the contacts 11 in an energizing circuit for a time relay 12 and when the water pressure is above a predetermined value, it closes the contacts 13 to complete an energizing circuit for a time relay 14. The closing of the contacts 15 of the time relay 12 is arranged to effect the energization of a starting circuit 16 for all of the motors 1, 2, and 3, and the opening of the contacts 17 of the time relay 14 is arranged to effect the deenergization of a stopping circuit 18 for all of the motors 1, 2, and 3.

The motor 1 has associated therewith an individual master relay 20 which, when energized, effects the closing of the associated line switch 7 and the energization of an associated time relay 21 and which, when deenergized, effects the energization of an associated time relay 22. The motor 2 is provided with a similar individual master relay 23, which controls the operation of the associated time relays 24 and 25, and the motor 3 is also provided with a similar individual master relay 26, which controls the operation of the associated time relays 27 and 28.

The sequence, in which the master relays 20, 23 and 26 are energized when the starting circuit 16 is energized by the time relay 12 closing its contacts 15, and in which they are deenergized when the stopping circuit 18 is opened by the relay 14 opening its contacts 17, is determined by the relative positions of the two-position control switches 30, 31, and 32, respectively associated with the motors 1, 2, and 3. In the particular arrangement shown in the drawing, any one of the motors can be made the first motor to be started and the last motor to be stopped by moving the associated two-position control switch to its left-hand position and all of the other two-position control switches to their right-hand positions. As shown in the drawing, the motor 1 is the leading unit since its control switch 30 is shown in its left-hand position, the motor 2 is the second motor to be started, and the motor 3 is the last motor to be started since their respective associated two-position control switches 31 and 32 are shown in their right-hand positions. If it is desired to make the motor 2 the leading unit, the control switch 30 is moved to its right-hand position, and the control switch 31 is moved to its left-hand position. The motor 2 is then the leading unit, the motor 3 is the second unit to be started, and motor 1 is the last unit to be placed in service. If it is desired to make the motor 3 the leading unit, the control switch 32 is moved to its left-hand position and the control switches 30 and 31 to their right-hand positions. The motor 3 is then the leading unit, the motor 1 is the second unit to be started and the motor 2 is the last unit to be placed in service.

When any one of the two-position control switches 30, 31, or 32 is in its left-hand position, and the rest of them are in their right-hand positions, the starting circuit 16 is connected to the associated master relay and the connection of the stopping circuit 18 is so controlled that the associated master relay cannot be deenergized until all of the other master relays have been deenergized for a predetermined time interval.

The motors 1, 2, and 3 are also respectively provided with the two-position control switches 40, 41, and 42 whereby any motor may be removed from the normal sequence and independently controlled without affecting the sequential operation of the other motors in response to the operation of the pressure relay 10.

The operation of the arrangement shown in the drawing is as follows: For the purpose of this description, it will be assumed that it is desired to have the motor 1 operate first when the water pressure decreases to a sufficient value to cause the pressure relay 10 to close its contacts 11. Consequently, the two-position control switches 30, 31, and 32 are in the positions in which they are shown in the drawing. Also, each of the master relays 20, 23, and 26 is assumed to be deenergized so that energizing circuits are respectively completed for the associated control relays 22, 25, and 28.

When the water pressure decreases to a predetermined value so that the pressure relay 10 closes its contacts 11, an energizing circuit is completed for the time relay 12. After being energized for a predetermined time, the time relay 12 closes its contacts 15 so as to energize the starting circuit 16. An energizing circuit is thereby completed for the master relay 20 and an associated auxiliary time-delayed drop-out relay 34 through the starting circuit 16, the contacts 43 of the control switch 30, the contacts 44 of the auxiliary relay 34, and the contacts 46 of the control switch 40. The closing of the contacts 45 of the master relay 20 completes a holding circuit for the relays 20 and 34 through the contacts 46 of the control switch 40, the contacts 47 of the control switch 31, the contacts 48 of the master relay 23, the contacts 49 of the control switch 32, the contacts 50 of the master relay 26, the contacts 51 of the control switch 30, the stopping circuit 18, and the contacts 17 of the relay 14.

The closing of the contacts 52 of the relay 20 completes an energizing circuit for the closing coil of the line switch 7 so that the motor 1 is connected to the supply circuit 4. The closing of the contacts 53 of the relay 20 completes an energizing circuit for the time relay 21, and the opening of the contacts 54 of the relay 20 interrupts the energizing circuit of the control relay 22 so that it closes its contacts 55.

If the water pressure is still too low after the time relay 21 has completed its timing operation, which is made long enough to allow the water pressure to be built up in response to the operation of the motor 1, a circuit is completed for the master relay 23 and the auxiliary time-delayed drop-out relay 56 associated with the motor 2 through the contacts 15 of the relay 12, the starting circuit 16, the contacts 43 of the control switch 30, the contacts 57 of the time relay 21, the contacts 58 of the control switch 31, the contacts 59 of the auxiliary relay 56, and the contacts 69 of the control switch 41. The closing of the contacts 60 of the master relay 23 completes a holding circuit for the master relay 23 and the auxiliary relay 56 associated with the motor 2 through the contacts 69 of the control switch 41, the contacts 49 of the control switch 32, the contacts 50 of the master relay 26, the contacts 51 of the control switch 30, the stopping circuit 18, and the contacts 17 of the relay 14. The closing of the contacts 61 of the master relay 23 completes an energizing circuit for the line switch 8 so that the motor 2 is connected to the supply circuit 5. The closing of the contacts 62 of the relay 23, which are arranged in any suitable manner so that they are closed before the contacts 48 are opened, completes through the contacts 84 of the control switch 41 a holding circuit for the master relay 20 and the auxiliary relay 34 associated with the motor 1, the preceding motor in the sequence, so that these relays are not deenergized by the opening of the contacts 48 of the relay 23 in the heretofore described holding circuit for these relays. The closing of the contacts 63 of the relay 23 completes an energizing circuit for the time relay 24, and the opening of the contacts 64 of the relay 23 interrupts the energizing circuit of the control relay 25 so that it closes its contacts 66 and completes a shunt circuit around the contacts 62 in the holding circuit for the relays 20 and 34 associated with the motor 1.

If the water pressure is still low when the time relay 24 completes its timing operation after the motor 2 is placed in service, a circuit is completed for the master relay 26 and the auxiliary time-delayed drop-out relay 70 associated with the motor 3 through the contacts 15 of the relay 12, the starting circuit 16, the contacts 43 of the control switch 30, the contacts 57 of the relay 21, the contacts 58 of the control switch 31, the contacts 71 of the time relay 24, the contacts 72 of the control switch 32, the contacts 73 of the relay 70, and the contacts 74 of the control switch 42. The closing of the contacts 75 of the relay 26 completes a holding circuit for the relays 26 and 70 through the contacts 74 of the control switch 42, the contacts 51 of the control switch 30, the stopping circuit 18, and the contacts 17 of the relay 14. The closing of the contacts 76 of the relay 26 completes an energizing circuit for the closing coil of the line switch 9 so that the motor 3 is connected to the supply circuit 6. The closing of the contacts 77 of the relay 26 which are arranged in any suitable manner so that they are closed before the contacts 50 are opened, completes through the contacts 90 of the control switch 42 a holding circuit for the master relay 23 and the auxiliary relay 56 associated with the motor 2 the preceding motor in the sequence, so that these relays do not become deenergized by the opening of the contacts 50 of the relay 26 in the heretofore described holding circuit for these relays. The closing of the contacts 78 of the relay 26 completes an energizing circuit for the time relay 27, and the opening of the contacts 79 of the relay 26 interrupts the energizing circuit of the relay 28 so that it closes its contacts 80, which are connected in parallel with the contacts 77 of the master relay 26 in the holding circuit for the relays 23 and 56 associated with the motor 2.

When all of the motors are in service and the water pressure increases above a predetermined value so that the contacts 13 of the water pressure responsive relay 10 are closed, a circuit is completed for the timing relay 14. If the water pressure remains above this predetermined value for a predetermined time, the relay 14 opens its contacts 17 in the heretofore described holding circuit for the master relay 26 and the auxiliary relay 70 associated with the motor 3. The opening of the contacts 76 of the relay 26 effects the opening of the switch 9 so that the motor 3 is disconnected from the supply circuit 6. The closing of the contacts 50 of the relay 26 re-establishes the heretofore described holding circuit for the master relay 23 and the auxiliary relay 56 associated with the motor 2 through the stopping circuit 18 and the contacts 17 of the relay 14. The closing of the contacts 79 of the relay 26 re-establishes the energizing circuit for the time relay 28, which after being energized for a predetermined time, opens its contacts 80 in the heretofore described holding circuit for the master relay 23 and the auxiliary relay 56 associated with the motor 2. Due to the fact that contacts 80 are not opened until after the motor 3 has been disconnected from the supply circuit 6, for a predetermined time, it is impossible to effect the disconnection of the motor 2 from the supply circuit 5 until after the motor 3 has been out of service for a predetermined time.

When only the motors 1 and 2 are in service, and the contacts 80 of the relay 28 are open, and the water pressure is above a predetermined value so that the timing relay 14 is energized for a predetermined time, the heretofore described holding circuit for the master relay 23 and the auxiliary relay 56 associated with the motor 2 is opened at the contacts 17 of the relay 14. The opening of the contacts 61 of the relay 23 effects the opening of the switch 8 so that the motor 2 is disconnected from the supply circuit 5. The closing of the contacts 48 of the relay 23 re-establishes the heretofore described holding circuit for the master relay 20 and the auxiliary relay 34 associated with the motor 1 through the stopping circuit 18 and the contacts 17 of relay 14. The closing of the contacts 64 of the relay 23 re-establishes the energizing circuit for the time relay 25, which after being energized for a predetermined time, opens its contacts 66 in the heretofore described holding circuit for the master relay 20 and the auxiliary relay 34 associated with the motor 1. Since the relay 25 does not open its contacts 66 until after the motor 2 has been out of service for a predetermined time, it will be observed that it is impossible for the motor 1 to be shut down in response to the water pressure being too high until after the motor 2 has been out of service for said predetermined time.

When only the motor 1 is in service and the contacts 66 of the time relay 25 are opened and the water pressure is above a predetermined value so that the relay 14 is energized for a predetermined time, the heretofore described holding circuit for the master relay 20 and the auxiliary relay 34 associated with the motor 1 is opened at the contacts 17 of the relay 14. The opening of the contacts 52 of the relay 20 effects the opening of the switch 7 so as to disconnect the motor 1 from the supply circuit 4.

From the above description of the arrangement shown in the drawing and of the operation thereof, it will be seen that when the water pressure decreases below a predetermined value, the time relay 12 must remain energized for a predetermined time before the next motor in the predetermined sequence can be started, and when the water pressure increases above a predetermined value, the time relay 14 must be energized for a predetermined time interval before the next motor in the predetermined sequence can be taken out of service. Such an arrangement eliminates false starting and stopping of a motor due to momentary pressure fluctuations. Each of the time relays 21, 24, and 27 also respectively prevents the next motor in the predetermined sequence from being started until after the associated motor has been in operation for a predetermined time, and each of the time relays 22, 25, and 28 respectively prevents the next motor in the predetermined sequence from being taken out of service until after the associated motor has been out of service for a predetermined time. Each of the time relays 34, 56, and 70 respectively prevents overlap with contacts 45, 60, and 75, respectively of master relays 20, 23, and 26, respectively, to prevent connecting the starting and stopping circuits 16 and 18 together. In this manner, sufficient time is allowed to elapse for the water pressure to reach a steady value after each motor is put into or taken out of service before another motor can be put into or taken out of service.

In case it is desired to make any other motor the leading unit in the predetermined sequence, the associated control switch, such as switch 31 for the motor 2 and the switch 32 for the motor 3, is moved to its left-hand position, and all of the other control switches are placed in their right-hand position.

When it is desired to control the operation of a motor independently of the position of the pressure switch 10, the associated control switch 30, 31, or 32 must be in its right-hand position and the associated control switch 40, 41, or 42 is moved to its right-hand position. For example, if it is desired to operate the motor 2 independently of the pressure relay 10, the control switches 31 and 41 are moved to their respective right-hand positions. The closing of the contacts 82 of the switch 41 prepares an energizing circuit for the relays 23 and 56, associated with the motor 2, which may be closed and opened at will by operating an associated control switch 86 to effect the starting and stopping of the motor 2. The opening of the contacts 69 of the switch 41 disconnects the relays 23 and 56 from the contacts 58 of the control switch 31 so as to prevent these relays from being connected across the starting circuit 16. The closing of the contacts 83 of the control switch 41 completes a shunt circuit around the contacts 48 of the master relay 23, and the opening of the contacts 84 of the control switch 41 interrupts the circuits through the contacts 62 of the relay 23 and the contacts 66 of the relay 25 so that the holding circuit for the relays 20 and 34 of the preceding motor 1 in the predetermined sequence is controlled by the positions of the relays 26 and 28 of the motor 3, which now follows the motor 1 in the predetermined sequence. The closing of the contacts 85 of the control switch 41 completes a shunt circuit around the contacts 71 of the time relay 24 so that the energization of the relays 26 and 70 of the motor 3 does not depend upon the position of the master relay 23 and the time-delayed relay 24.

When any one of the control switches 30, 31 or 32 is placed in its left-hand position, in order to select the associated unit as the leading unit, the respective contact 91, 47 or 49 is opened in order to prevent the respective parallel connected contacts 93 and 55, 62 and 66 or 77 and 80 from establishing a permanent holding circuit for the last master relay to be energized in response to the energization of the starting circuit. Similarly, when any one of the control switches 40, 41 or 42 is placed in its right-hand position in order to cut the associated unit out of the predetermined sequence, the respective contact 92, 84 or 90 is opened in order to prevent the parallel connected contacts 93 and 55, 62 and 66 or 77 and 80 from establishing a holding circuit for the master relay associated with unit preceding the cut out unit in the predetermined sequence.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. An arrangement for effecting the automatic operation of a plurality of devices in a predetermined sequence comprising a control circuit, means for energizing said circuit, an individual control relay for each device, means responsive to the energization of a control relay for effecting the operation of the associated device, a two-position switch individual to each device and arranged when in one of its positions to connect the associated control relay to said control circuit so that the associated device is the first to be operated in response to the energization of said control circuit, and timing means responsive to the energization of a control relay for connecting the control relay associated with the next device in the predetermined sequence to said control circuit when the two-position switch individual to such next device is in its other position.

2. An arrangement for effecting the automatic operation of a plurality of devices in a predetermined sequence comprising a control circuit, means for energizing said control circuit, an individual control relay for each device, means responsive to the energization of a control relay for effecting the operation of the associated device, a two-position switch individual to each device and arranged when in one of its positions to connect the associated control relay to said control circuit so that the associated device is the first to be operated in response to the energization of said control circuit, timing means responsive to the energization of a control relay for connecting the control relay associated with the next device in the predetermined sequence to said control circuit when the two-position switch individual to such next device is in its other position, and means responsive to the energization of a control relay for completing a holding circuit therefor as long as any control relay associated with a subsequent device in the predetermined sequence is energized.

3. An arrangement for effecting the automatic operation of a plurality of devices in a predetermined sequence comprising a control circuit, means for energizing and deenergizing said control circuit, an individual control relay for each device, means responsive to the energization of a control relay for effecting the operation of the associated device, a two-position switch individual to each device and arranged when in one of its positions to connect the associated control relay to said control circuit so that the associated device is the first to be operated in response to the energization of said control circuit, timing means responsive to the energization of a control relay for connecting the control relay associated with the next device in the predetermined sequence to said control circuit when the two-position switch individual to such next device is in its other position, and means for completing a holding circuit for a control relay while the control relay associated with the next device in the predetermined sequence is energized and for a predetermined time interval after such last mentioned control relay is deenergized.

4. An arrangement for effecting the automatic operation of a plurality of devices in a predetermined sequence comprising a control circuit, means for energizing and deenergizing said control circuit, an individual control relay for each device, means responsive to the energization of a control relay for effecting the operation of the associated device, a two-position switch individual to each device and arranged when in one of its positions to connect the associated control relay to said control circuit so that the associated device is the first to be operated in response to the energization of said control circuit, timing means responsive to the energization of a control relay for connecting the control relay associated with the next device in the predetermined sequence to said control circuit when the two-position switch individual to such next device is in its other position, means responsive to the energization of a control relay for completing a holding circuit therefor as long as any control relay associated with a subsequent device in the predetermined sequence is energized and for a predetermined time interval after the last control relay associated with the subsequent devices in the predetermined sequence becomes deenergized.

5. An arrangement for effecting the automatic operation of a plurality of devices in a predetermined sequence comprising a starting circuit, means for energizing and deenergizing said starting circuit, a stopping circuit, means for energizing and deenergizing said stopping circuit, an individual control relay for each device, means responsive to the energization of a control relay for effecting the operation of the associated device, a two-position switch individual to each device and arranged when in one of its positions to connect the associated control relay to said starting circuit so that the associated device is the first to be operated in response to the energization of said control circuit, timing means responsive to the energization of a control relay for connecting the control relay associated with the next device in the predetermined sequence to said starting circuit when the two-position switch individual to such next device is in its other position, and means responsive to the energization of a control relay for completing a holding circuit therefor through said stopping circuit when all of the two-position switches associated with the subsequent devices in the predetermined sequence are in their other positions and all of the control relays associated with such subsequent devices are deenergized.

6. An arrangement for effecting the automatic operation of a plurality of devices in a predetermined sequence comprising a starting circuit, means for energizing and deenergizing said starting circuit, a stopping circuit, means for energizing and deenergizing said stopping circuit, an individual control relay for each device, means responsive to the energization of a control relay for effecting the operation of the associated device, a two-position switch individual to each device and arranged when in one of its positions to connect the associated control relay to said circuit so that the associated device is the first to be operated by the energization of said control circuit, timing means responsive to the energization of a control relay for connecting the control relay associated with the next device in the predetermined sequence to said control circuit when the two-position switch individual to such next device is in its other position, and means responsive to the energization of a control relay for completing a holding circuit therefor through said stopping circuit when all of the two-position switches associated with the subsequent devices in the predetermined sequence are in their other positions and all of the control relays associated with such subsequent devices are deenergized and for completing independently of said stopping circuit another holding circuit for the control relay associated with the preceding device in the predetermined sequence.

7. An arrangement for effecting the automatic operation of a plurality of devices in a predetermined sequence comprising a starting circuit, means for energizing and deenergizing said starting circuit, a stopping circuit, means for energizing and deenergizing said stopping circuit, an individual control relay for each device, means responsive to the energization of a control relay for effecting the operation of the associated device, a two-position switch individual to each device and arranged when in one of its positions to connect the associated control relay to said circuit so that the associated device is the first to be operated by the energization of said control circuit, timing means responsive to the energization of a control relay for connecting the control relay associated with the next device in the predetermined sequence to said control circuit when the two-position switch individual to such next device is in its other position, means responsive to the energization of a control relay for completing a holding circuit therefor through said stopping circuit when all of the two-position switches associated with the subsequent devices in the predetermined sequence are in their other positions and all of the control relays associated with such subsequent devices are deenergized and for completing independently of said stopping circuit another holding circuit for the control relay associated with the preceding device in the predetermined sequence, and timing means individual to each control relay and controlled thereby for completing for a predetermined time interval after the deenergization of the associated control relay a holding circuit for the control relay associated with the preceding device in the predetermined sequence.

8. An arrangement for effecting the automatic operation of a plurality of devices in a predetermined sequence comprising a starting circuit, means for energizing and deenergizing said starting circuit, a stopping circuit, means for energizing and deenergizing said stopping circuit, an individual control relay for each device, means responsive to the energization of a control relay for effecting the operation of the associated device, a two-position switch individual to each device and arranged when in one of its positions to connect the associated control relay to said circuit so that the associated device is the first to be operated by the energization of said control circuit, timing means responsive to the energization of a control relay for connecting the control relay associated with the succeeding device in the predetermined sequence to said control circuit when the two-position switch individual to such succeeding device is in its other position, means responsive to the energization of a control relay for completing a holding circuit therefor through said stopping circuit when all of the two-position switches associated with the subsequent devices in the predetermined sequence are in their other positions and all of the control relays associated with such subsequent devices are deenergized and for completing independently of said stopping circuit another holding circuit for the control relay associated with the preceding device in the predetermined sequence, and means associated with each control relay for preventing a connection between said starting and stopping circuits.

9. An arrangement for effecting the automatic operation of a plurality of devices in a predetermined sequence comprising a starting circuit, means for energizing and deenergizing said starting circuit, a stopping circuit, means for energizing and deenergizing said stopping circuit, an individual control relay for each device, means responsive to the energization of a control relay for effecting the operation of the associated device, a two-position switch individual to each device and arranged when in one of its positions to connect the associated control relay to said circuit so that the associated device is the first to be operated by the energization of said control circuit, timing means responsive to the energization of a control relay for connecting the control relay associated with the succeeding device in the predetermined sequence to said control circuit when the two-position switch individual to such succeeding device is in its other position, means responsive to the energization of a control relay for completing a holding circuit therefor through said stopping circuit when all of the two-position switches associated with the subsequent devices in the predetermined sequence are in their other positions and all of the control relays associated with such subsequent devices are deenergized and for completing independently of said stopping circuit another holding circuit for the control relay associated with the preceding device in the predetermined sequence, and individual switching means associated with each device for cutting the associated device out of said predetermined sequence without effecting the sequential operation of the other devices.

10. An arrangement for effecting the automatic operation of a plurality of devices in a predetermined sequence comprising a starting circuit, means for energizing and deenergizing said starting circuit, a stopping circuit, means for energizing and deenergizing said stopping circuit, an individual control relay for each device, means responsive to the energization of a control relay for effecting the operation of the associated device, a two-position switch individual to each device and arranged when in one of its positions to connect the associated control relay to said circuit so that the associated device is the first to be operated by the energization of said control circuit, timing means responsive to the energization of a control relay for connecting the control relay associated with the succeeding device in the predetermined sequence to said control circuit when the two-position switch individual to such succeeding device is in its other position, means responsive to the energization of a control relay for completing a holding circuit therefor through said stopping circuit when all of the two-position switches associated with the subsequent devices in the predetermined sequence are in their other positions and all of the control relays associated with such subsequent devices are deenergized and for completing independently of said stopping circuit another holding circuit for the control relay associated with the preceding device in the predetermined sequence, individual switching means associated with each device for cutting the associated device out of said predetermined sequence without effecting the sequential operation of the other devices, and means for stopping and starting each cut out device independently of the conditions of the other devices remaining in the predetermined sequence.

JOHN CURTIS HOYT.